(12) United States Patent
Cloin et al.

(10) Patent No.: US 11,276,128 B2
(45) Date of Patent: Mar. 15, 2022

(54) TECHNIQUES FOR RESTAURANT TRANSACTION PROCESSING

(71) Applicant: NCR Corporation, Duluth, GA (US)

(72) Inventors: James Asa Cloin, Arlington, TX (US); James Lee Fortuna, Dallas, TX (US)

(73) Assignee: NCR Corporation, Atlanta, GA (US)

( * ) Notice: Subject to any disclaimer, the term of this patent is extended or adjusted under 35 U.S.C. 154(b) by 109 days.

(21) Appl. No.: 15/657,637

(22) Filed: Jul. 24, 2017

(65) Prior Publication Data

US 2017/0323401 A1 Nov. 9, 2017

Related U.S. Application Data

(63) Continuation of application No. 13/656,037, filed on Oct. 19, 2012, now Pat. No. 9,760,958.

(51) Int. Cl.
| | |
|---|---|
| G06Q 50/12 | (2012.01) |
| G06Q 20/32 | (2012.01) |
| G06Q 30/06 | (2012.01) |
| G06Q 20/40 | (2012.01) |
| G06Q 20/22 | (2012.01) |

(52) U.S. Cl.
CPC .......... *G06Q 50/12* (2013.01); *G06Q 20/223* (2013.01); *G06Q 20/32* (2013.01); *G06Q 20/322* (2013.01); *G06Q 20/3278* (2013.01); *G06Q 20/405* (2013.01); *G06Q 30/06* (2013.01)

(58) Field of Classification Search
CPC ...... G06Q 50/12; G06Q 20/405; G06F 9/466; H04N 2005/4456; G07G 1/009
See application file for complete search history.

(56) References Cited

U.S. PATENT DOCUMENTS

| | | | |
|---|---|---|---|
| 9,240,006 B2* | 1/2016 | White | G06Q 50/12 |
| 2005/0065851 A1* | 3/2005 | Aronoff | G06Q 50/12 |
| | | | 705/15 |
| 2008/0147539 A1* | 6/2008 | Robertson | G06Q 20/28 |
| | | | 705/39 |
| 2010/0078472 A1* | 4/2010 | Lin | G06Q 40/02 |
| | | | 235/379 |
| 2012/0130888 A1* | 5/2012 | Cooke | G06Q 20/3272 |
| | | | 705/39 |
| 2014/0324606 A1* | 10/2014 | Fortuna | G06Q 20/322 |
| | | | 705/15 |

OTHER PUBLICATIONS

Cavoukian, A. (Nov. 2011). Mobile Near Field Communications (NFC) (Year: 2011).*

* cited by examiner

*Primary Examiner* — Fahd A Obeid
*Assistant Examiner* — Avia Salman
(74) *Attorney, Agent, or Firm* — Schwegman, Lundberg & Woessner

(57) ABSTRACT

Techniques for restaurant transaction processing are provided. A handheld device of a waiter is used to automatically associate a check with a table at a restaurant and to recall and modify that check. In an embodiment, two waiters use one or more handheld devices to automatically transfer a customer's check to one another.

7 Claims, 3 Drawing Sheets

TECHNIQUES FOR RESTAURANT TRANSACTION PROCESSING

BACKGROUND

Automation for goods and services has reached record levels in society. Examples are everywhere from online banking and purchasing to a wide-range of devices and physical appliances that include computing and networking capabilities, which were just wishful dreams only a decade ago. For the most part, these advances have occurred because of breakthroughs in electronics and wireless communications, which have allowed complex processing and network connectivity to be achieved in the smallest of physical devices, such as a smart phone or other handheld computing devices, for relatively small cost and effort.

One business process that has not advanced to any significant degree is waiting on guests in the full-service restaurant industry. True, consumers can pre-order online, make reservations online, view menus online, and the like; but, the onsite physical experience associated with the meal has not advanced to any significant degree.

One area that experiences frequent issues within the restaurant industry is associated with opening and retrieving a customer's check. Opening or retrieving a check using a touch screen user interface on a handheld computer is often slower than optimal, particularly when attempting to engage guests in eye contact and conversation. The process is also inherently error prone, as the manual entry of the table number can result in the accidental assignment of certain order actions to the wrong table or check; thereby, creating downstream operational problems and customer satisfaction issues.

Another issue associated with the restaurant industry is related to the process of transferring responsibility for a guest check between employees of the restaurant. Specifically, transferring a restaurant guest check from one waiter's responsibility to another waiter's responsibility is often required in modern restaurants in order for restaurant staff to care for guests as best as possible while retaining proper financial controls. Guest check transfers, however, have traditionally been multi-step processes requiring that each of at least two waiters log into a Point Of Sale (POS) system in a specific sequence; each then conducting actions related to the initiation and receipt of the check being transferred prior to the receiving waiter being able to take any actions on the transferred check. In a busy restaurant that uses only fixed-position POS terminals, this can be a cumbersome and time-consuming process requiring both waiters to engage in the process together, first finding an available POS terminal on which to conduct their respective activities in sequence. Handheld computers can simplify this process somewhat, often eliminating the need to find an available POS terminal since either one or both of the initiating and receiving waiters is in possession of his/her own handheld computer at the outset of the transfer process. Even in these cases, however, existing solutions still require that both waiters engage in multiple, explicit, and manual steps in the user interfaces of the available computer or computers to complete the transfer process.

SUMMARY

In various embodiments, techniques for restaurant transaction processing are presented. According to an embodiment, a method for restaurant transaction processing is provided.

Specifically, a table identifier for a table of a restaurant is acquired by a handheld device of a waiter. Next, a check for a customer at the table is automatically opened for the waiter on the handheld device. The waiter then uses the handheld device to modify the check.

DETAILED DESCRIPTION

Figure 1:
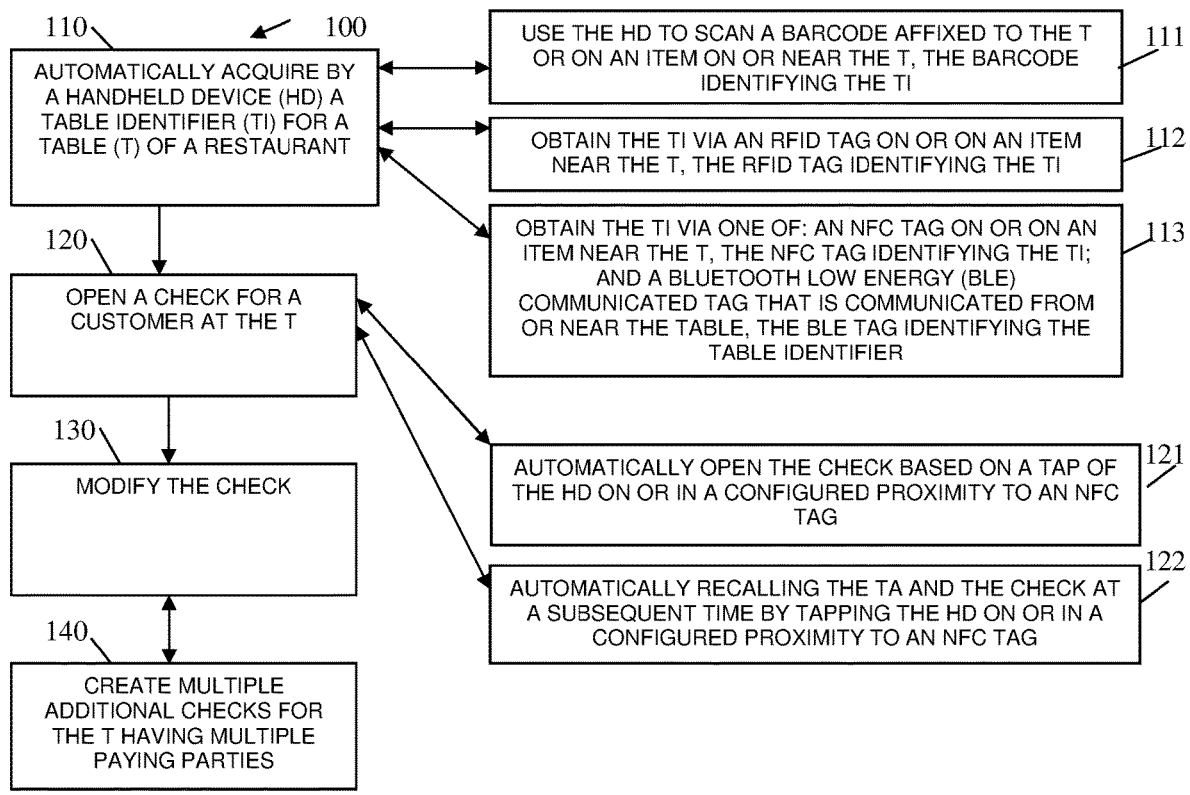
FIG. 1 is a diagram of a method for restaurant transaction processing, according to an example embodiment.

FIG. 1 is a diagram of a method 100 for restaurant transaction processing, according to an example embodiment. The method 100 (hereinafter "table manager") is implemented as instructions programmed and residing on a non-transitory computer-readable (processor-readable) storage medium and executed by one or more processors. The processors are specifically configured and programmed to process the table manager. The table manager operates over a network. The network is wired, wireless, or a combination of wired and wireless.

In an embodiment, the table manager processes on processors of a handheld computing device. As used herein a "handheld computing device," includes a portable device that communicates with a network wirelessly, such as but not limited to, a tablet, a smart phone, a customized retail computing device, and the like.

Additionally, the term "tag" can include any format associated with Near Field Communication (NFC), Bluetooth, Bluetooth Low Energy (BLE), Radio Frequency (RF), Quick Response (QR) codes, barcodes, or combinations of these formats. The tag is also embodied within a computer-readable medium as a data structure, data glyph, image, and/or string of characters (alphanumeric, numeric, symbols, punctuation, printable, and/or unprintable).

As will be demonstrated herein the techniques presented with the FIG. 1 eliminate the human factors problems associated with a waiter opening or retrieving a check for a specific table as the result of a process where a handled device ("handheld," "handheld device," or "handheld computing device may be used interchangeably and synonymously herein) reads a Radio Frequency Identifier (RFID) tag previously associated with that specific table. Once the check is opened or retrieved, the waiter is then able to immediately begin taking actions against that check including order entry, payment application, etc. without first having to manually enter a table number. It is noted that use of the term "waiter" is intended to be gender neutral and is intended to mean a staff member at a restaurant serving guests.

So, an RFID tag is first physically associated with a table. That physical association may be established by affixing the tag to table surface, embedding the tag in the table or affixing the tag to an object associated with the table such as a table tent, condiment rack, etc. The tag may optionally be visible to the guest party and wait staff, and if visible may optionally display a human readable number and/or symbolic code such as a Quick Response (QR) code in which case the handheld of the waiter can scan the QR code. In any case, after the physical association between the physical tag and the table is made a logical association is further made in software, preferably using a handheld computer in a simple, one-time setup process. This logical association ties a human readable table number to the machine readable RFID tag value of the tag that was physically associated with the table. Once the logical association has been completed, the waiter can tap a Near Field Communication (NFC) tag located at the customer's table to automatically open a check associated specifically with that table on the waiter's handheld. At subsequent stages in the guest transaction, the same tap gesture can be used to select an already opened check for any necessary modifications to the guest check, including adding, deleting or changing any items or modifiers, the application of promotions and discounts, the application of payments, etc.

As used herein the phrase "opened check" refers to an initial creation of a check or retrieval of an already created check. Thus, use of the phrase can be used synonymously with either of these meanings (creation and/or retrieval).

These techniques simultaneously speed the process of opening or retrieving a check while also eliminating errors such as: i) assigning a newly opened check to the wrong table, ii) performing actions against the wrong check (i.e., erroneously retrieving check 11 instead of check 12 and subsequently taking actions on check 11 instead of check 12). Additionally, the presented techniques utilize the same handheld computer hardware and software for making the logical associations described in (b) above that are further used by wait staff for guest service purposes; eliminating the need for special equipment or software for the setup process. Additionally, it is increasingly the case that restaurant guests find appeal in the use of technology associated with the guest service process and automatically opening or retrieving a check with the processes described herein has a certain "wow factor" that may enhance the guest service experience and increase revenues for a restaurant establishment.

In an embodiment, the table manager is in communication with a restaurant waiter having a transaction processing manager (such as the transaction processing manager 301 of the FIG. 3 discussed below) for purposes of identifying tables and establishing checks for ongoing transactions with customers at the tables of the restaurant. In other words, the transaction processing manager acting as a centralized manager for transactions of the restaurant.

At 110, the table manager automatically acquires, via the handheld device, a table identifier for a specific table of a restaurant. This can be done in a variety of manners.

For example, at 111, the table manager uses the handheld device to scan a barcode or tag (can be a QR code) via an integrated scanner of the handheld device. The barcode or tag affixed to the table or on an item on or near the table and the barcode uniquely identifying the table identifier for the table. It is noted that the association between the barcode and table identifier can be acquired from a restaurant waiter having the transaction processing manager (discussed above and below with reference to the FIG. 3). The handheld device can also include interface mechanisms for obtaining a code, token, or tag from the table or near the table that is communicated using Bluetooth or Bluetooth Low Energy (Bluetooth 4).

In another case, at 112, the table manager obtains the table identifier via an RFID tag on or on an item near the table. The RFID tag identifies the table identifier. Again, it is noted that the association between the RFID tag and the table identifier can be acquired from a restaurant waiter having the transaction processing manager (discussed above and below with reference to the FIG. 3).

In still another situation, at 113, the table manager obtains the table identifier via an NFC tag on or on an item near the table. The NFC tag identifies the table identifier. Once more it is noted that the association between the NFC tag and the table identifier can be acquired from a restaurant waiter having the transaction processing manager (discussed above and below with reference to the FIG. 3).

At 120, the table manager opens, via the handheld device, a check for a customer at the table.

According to an embodiment, at 121, the table manager automatically opens the check based on a tap of the handheld device on or in a configured proximity to an NFC tag.

At 130, the table manager modifies, via the handheld device, the check.

In an embodiment, at 131, the table manager automatically recalls the table and the check at a subsequent time by tapping the handheld device on or in a configured proximity to an NFC tag. Here, the waiter can recall the specific check for that table each time a change is needed as ordered by the customer by simply tapping the waiter's handheld device on the NFC tag.

According to an embodiment, at 140, the table manager creates, via the handheld device, multiple additional checks for the table having multiple paying parties. This can be achieved for people together and splitting the check for the overall table. This can be done via multiple taps in succession or scans (as the case may be with respect to the embodiments of 111-113) or via an interface through entry options of the waiter on the handheld device.

Figure 2:
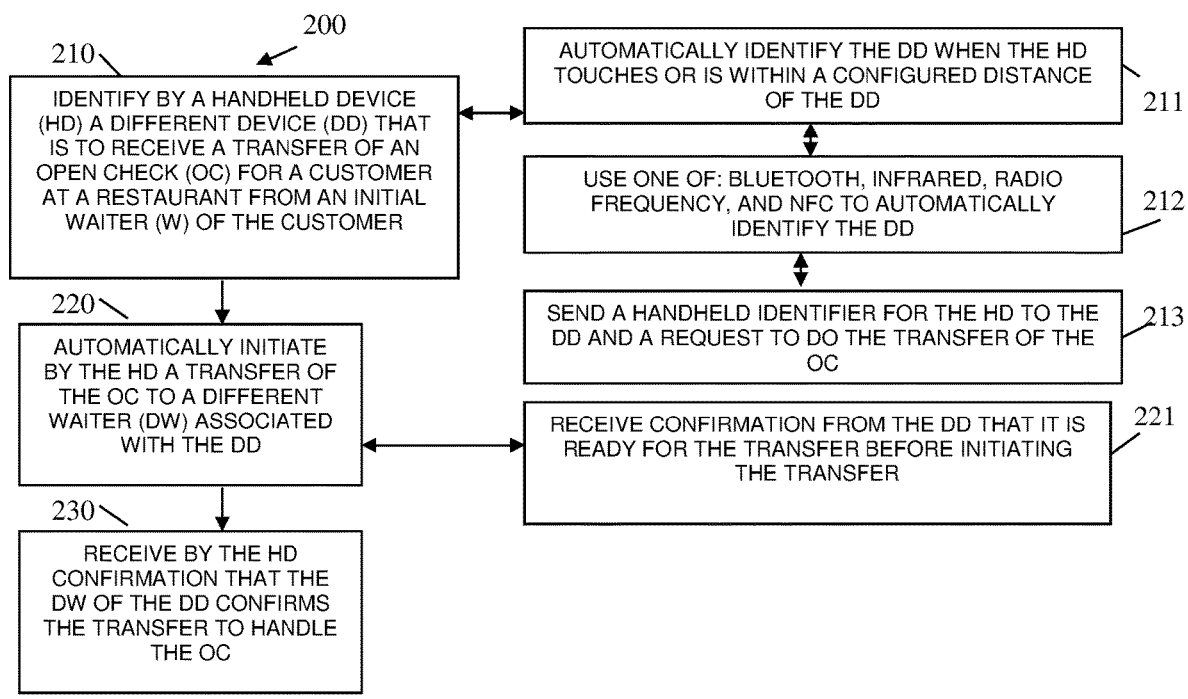
FIG. 2 is a diagram of another method for restaurant transaction processing, according to an example embodiment.

FIG. 2 is a diagram of another method 200 for restaurant transaction processing, according to an example embodiment. The method 200 (hereinafter "check transfer manager") is implemented as instruction and programmed within a non-transitory computer-readable (processor-readable) storage medium that executes on one or more processors of a handheld device; the processors of the handheld device are specifically configured to execute the check transfer manager. The check transfer manager is operational over a network; the network is wired, wireless, or a combination of wired and wireless.

Whereas the table manager (the FIG. 1 above) describes processing associated with restaurant processing for opening and modifying a check for a specific table. The check transfer manager describes processing associated with transferring a check between waiters or staff within a restaurant establishment. Both are associated with retail transaction processing; just different aspects of a retail transaction process.

The techniques associated with the check transfer manager eliminate all but one of the traditional manual steps for transferring a guest check; each of the initiating and receiving waiters, making the process of transferring a check from one waiter to the other much faster and virtually error free.

Specifically, RFID readers and tags are first physically associated with each computer (can include a handheld device or even a standalone POS or desktop computing device) that engages in tap-to-transfer processes. This may be done at the time of the computer's manufacture, or in a post-manufacturing upgrade process for the computers. Subsequently, the RFID tags, which are physically associated with specific computers, are then logically associated with those computers in POS software, which optionally may auto-detect those tags and eliminate one or more steps related to the logical association. At any time after the logical association is made, the waiter initiating a transfer uses POS software running on one of the associated computers (again can be a handheld) to designate a given check as ready for transfer. At this point, the initiating and receiving computers are presented to one another, as a practical matter at least one of them being a handheld computer (so one can be a stationary computing terminal device). One or both computers then reads the RFID tag of the other, commencing the transfer process in the software. The receiving waiter then receives a message on his/her computer indicating that the check in question is being transferred, and may optionally accept or decline the transfer.

These approaches leverage the fact that the mobility of computing devices now enables computers to easily be presented to one another in order to simplify and accelerate the traditionally cumbersome process of transferring the responsibility of the guest check (and the associated customer care of the guest party) from one waiter to another. This allows restaurant staffs to more quickly and efficiently provide the best service possible to restaurant guests.

In an embodiment, the table manager is in communication with a restaurant waiter having a transaction processing manager (such as the transaction processing manager 301 of the FIG. 3 discussed below) for purposes of identifying open checks and specific waiters and their devices. In other words, the transaction processing manager acting as a centralized manager for transactions of the restaurant.

At 210, the check transfer manager identifies, via the handheld device, a different device that is to receive a transfer of an open check for a customer at a restaurant from an initial waiter of that customer.

According to an embodiment, at 211, the check transfer manager automatically identifies the different device (discussed at 220 below) when the handheld device touches or is within a configured distance of the different device.

Continuing with the embodiment of 211 and at 212, the check transfer manager uses one of: Bluetooth, Infrared, RF, and NFC to automatically identify the different device.

Still continuing with the embodiment of 212 and at 213, the check transfer manager sends a handheld identifier for the handheld device to the different device and a request to do the transfer of the open check.

At 220, the check transfer manager automatically initiates, via the handheld device the transfer of the open check to a different sever/waiter associated with the different device.

According to an embodiment at 221, the check transfer manager contacts a server (via a transaction processing manager, such as the one discussed below with reference to the FIG. 3) to record and assist in the transfer.

In another case, at 222, the check transfer manager receives confirmation from the different device that it is ready for the transfer before initiating the transfer.

In an embodiment, at 230, the check transfer manager receives, via the handheld device, confirmation that the different waiter of the different device confirms the transfer to handle the open check.

Figure 3:
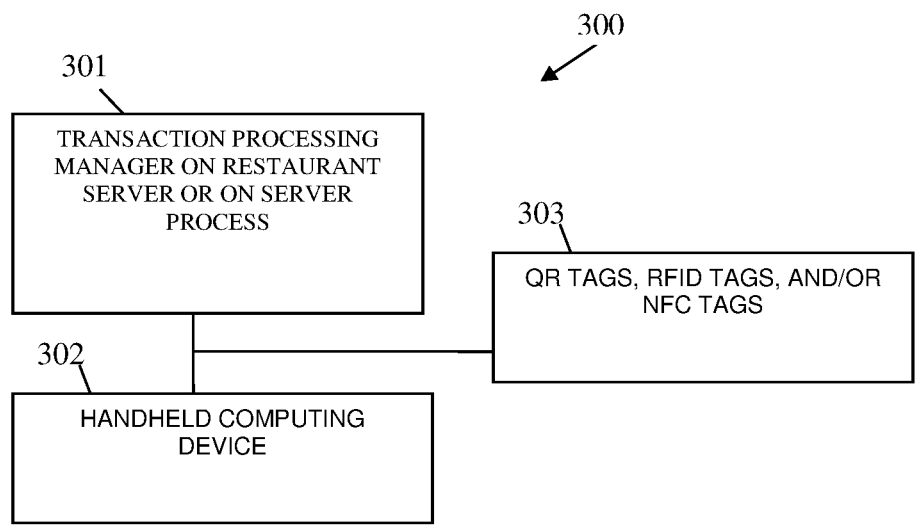
FIG. 3 is a diagram restaurant transaction system, according to an example embodiment.

FIG. 3 is a diagram restaurant transaction system 300, according to an example embodiment. The restaurant transaction system 300 is implemented as executable instructions and programmed within memory of processors or a non-transitory computer-readable (processor-readable) storage medium that executes on one or more processors of one or multiple computing devices; the processors of the computing devices are specifically configured to execute the restaurant transaction system 300. The restaurant transaction system 300 is operational over a network; the network is wired, wireless, or a combination of wired and wireless.

The restaurant transaction system 300 implements, inter alia, server-side processing associated with the method 100 and the method 200 of the FIGS. 1 and 2, respectively.

The restaurant transaction system 300 includes a transaction processing manager 301.

The transaction processing manager 301 is implemented and resides within memory or non-transitory computer-readable storage medium of a server. Example aspects of the transaction processing manager were discussed via interactions of the handhelds discussed above with respect to the FIG. 1.

The transaction processing manager 301 is configured to facilitate automated check opening and modification via handheld devices 302 (as discussed above with reference to the table manager processing of the FIG. 1) of waiters in a restaurant.

The transaction processing manager 301 is also configured to facilitate automated check transferring between different waiters using the handheld devices 302.

According to an embodiment, the transaction processing manager 301 is configured to maintain RFID tags 303 for tables in the restaurant.

In another case, the transaction processing manager 301 is configured to maintain QR tags 303 for tables in the restaurant.

In still another situation, the transaction processing manager 301 is configured to maintain NFC tags 303 for tables in the restaurant.

In an embodiment, the transaction processing manager 301 is configured to associate a provided tag 303 from one of the handheld devices 302 with a specific handheld device 302 or with a specific table within the restaurant.

In one case, the transaction processing manager 301 is configured to interact with the handheld devices 302 to provide specific table, specific check, and specific waiter information for any given transaction.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method for transaction processing, the method implemented as executable instructions programmed in a memory and the executable instructions executed from the memory by one or more processors of a first handheld device and a second handheld device, the method comprising:

obtaining, by executable instructions executed by the processors of the first handheld device and the second handheld device, an identifier, wherein the identifier received on the first handheld device, and wherein the identifier is obtained for a table;

automatically opening, by the executable instructions, a transaction as an open transaction based on the obtaining the identifier, wherein automatically opening further includes opening at least one second transaction as at least one second open transaction and based on obtaining the identifier more than one time during the obtaining, wherein automatically opening during the obtaining further includes tapping the first handheld device on the table once for the first handheld device to obtain the identifier and the open transaction and tapping the first handheld device on the table multiple times in succession to obtain the at least one second transaction as the at least one second open transaction, and wherein the open transaction corresponds to a first check maintained for a first order at table and each at least one second open transaction corresponds to a second check maintained for a different order at the table;

recalling, by the executable instructions, a specific open transaction from the open transaction and the at least one second open transaction on the first handheld device each time the first handheld device wirelessly reads the identifier for the table causing the open transaction and the at least one second open transaction to be displayed on the first handheld device for selection as the specific open transaction;

tapping the first handheld device to the second handheld device;

automatically initiating, by the executable instructions, a wireless transfer of the specific open transaction from processing on the first handheld device to processing on the second handheld device; and processing, by the executable instructions on the second handheld device, payment for the open transaction and the at least one second open transaction to close the open transaction and the at least one second open transaction by providing the payment;

wherein automatically initiating further includes notifying, by the executable instructions on the first handheld device, a transaction processing manager of the wireless transfer from the first handheld device to the second handheld device, wherein the transaction processing manager executes on a server and is accessible over a network, wherein the transaction processing manager acts as a centralized manager for opening transactions, transferring the transactions, and completing payment processing for the transactions.

2. The method of claim 1 further comprising, receiving, by the first handheld device confirmation that the second handheld device confirms transfer to handle the specific open transaction.

3. The method of claim 1, wherein tapping further includes automatically identifying the second handheld device when the first handheld device physically touches the second handheld device.

4. The method of the claim 3, wherein automatically identifying further includes using one of:
Radio Frequency and Near Field Commination to automatically identify the second handheld device.

5. The method of claim 4, wherein using further includes sending a handheld identifier for the first handheld device to the second handheld device and a request to do the transfer of the specific open transaction.

6. The method of claim 1, wherein automatically initiating further includes contacting the transaction processing manager of the server for recording and assisting in the transfer.

7. The method of claim 1, wherein automatically initiating further includes receiving confirmation from the second handheld device that it is ready for the transfer before initiating the transfer.

* * * * *